United States Patent
Ehrenstråle et al.

(10) Patent No.: US 6,757,385 B1
(45) Date of Patent: Jun. 29, 2004

(54) SYMMETRY BASED SUBBAND ACOUSTIC ECHO CANCELLATION

(75) Inventors: Fredrik Ehrenstråle, Malmö (SE); Patrik Grundström, Malmö (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 09/574,661

(22) Filed: May 18, 2000

Related U.S. Application Data (60) Provisional application No. 60/137,537, filed on Jun. 4, 1999.

(51) Int. Cl.[7] ............................................. H04M 9/08
(52) U.S. Cl. ........................... 379/406.14; 379/406.01; 379/406.02; 379/406.06; 379/406.08; 379/406.09; 379/406.12; 379/406.13
(58) Field of Search ................... 379/406.01–406.16

(56) References Cited

U.S. PATENT DOCUMENTS

| | | | |
|---|---|---|---|
| 4,677,668 A | 6/1987 | Ardalan et al. ............. 379/411 |
| 5,396,554 A | 3/1995 | Hirano et al. ............... 379/410 |
| 5,436,940 A | * 7/1995 | Nguyen | |
| 5,553,014 A | * 9/1996 | De Leon, II et al. | |
| 5,566,167 A | * 10/1996 | Duttweiler | |
| 5,568,558 A | 10/1996 | Ramm et al. ................ 381/94 |
| 5,761,318 A | 6/1998 | Shimauchi et al. .......... 381/66 |
| 5,889,857 A | * 3/1999 | Boudy et al. | |

FOREIGN PATENT DOCUMENTS

| EP | 0 739 102 A2 | 10/1996 |
|---|---|---|
| JP | 0739102 A2 * | 10/1996 |

OTHER PUBLICATIONS

International Search Report for PCT/EP 00/04860 Completed Nov. 17, 2000.

* cited by examiner

Primary Examiner—Forester W. Isen
Assistant Examiner—Ramnandan Singh
(74) Attorney, Agent, or Firm—Jenkens & Gilchrist, P.C.

(57) ABSTRACT

Processing complexity in an acoustic echo canceller can be reduced by partitioning the input near-end and far-end signals into respective pluralities of frequency subband signals. Also, due to the complex conjugate symmetry of conventional Discrete Fourier Transform matrices, not all of the subband signals of each plurality need be subjected to echo cancellation processing. The subband signals that would have otherwise been produced by echo cancellation processing are instead provided by producing complex conjugates of selected ones of the subband signals that have been subjected to echo cancellation processing.

29 Claims, 5 Drawing Sheets

$$W^* \quad \frac{1}{4} \begin{bmatrix} 1 & 1 & 1 & 1 \\ 1 & j & -1 & -j \\ 1 & -1 & 1 & -1 \\ 1 & -j & -1 & j \end{bmatrix}$$

SYMMETRY BASED SUBBAND ACOUSTIC ECHO CANCELLATION

This application claims the priority under 35 USC 119(e)(1) of copending U.S. Provisional Application No. 60/137,537, filed on Jun. 4, 1999.

FIELD OF THE INVENTION

The invention relates generally to bidirectional audio communications and, more particularly, to echo cancellation in such communications.

BACKGROUND OF THE INVENTION

Figure 1:
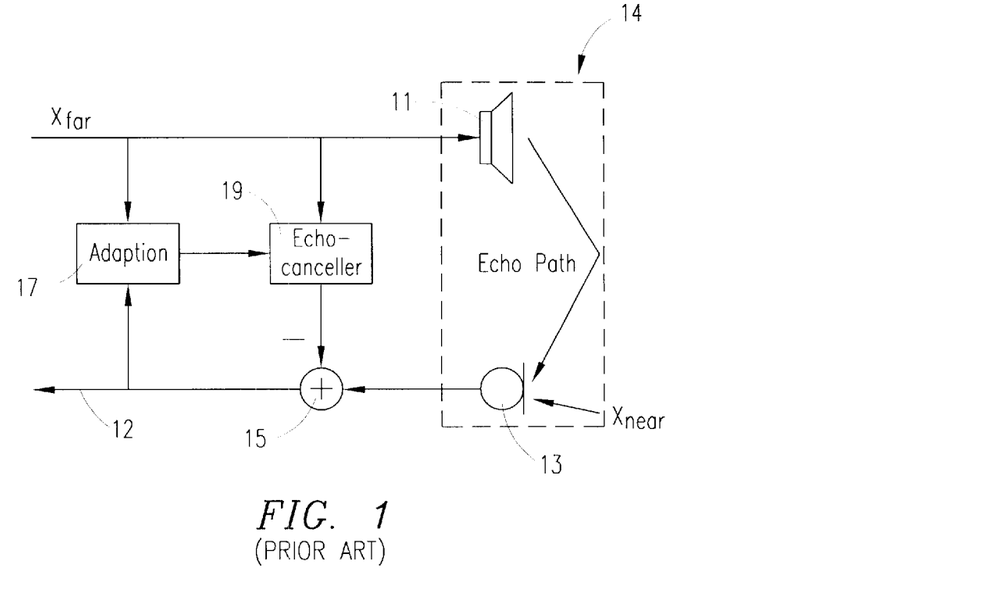
FIG. 1 illustrates a conventional communication device including an echo canceller.

FIG. 1 illustrates a conventional communication device in which echo cancellation techniques are utilized. The device of FIG. 1 could be, for example, a telephone (fixed or mobile) including a hands-free speaker/microphone arrangement at 14. A signal $x_{far}$ from a far-end source is reproduced at loudspeaker 11. When the sound emerges from loudspeaker 11, it bounces off of surrounding structures and back into a microphone 13 that also receives a signal $x_{near}$ from a near-end source. Because of this echo phenomenon, a listener at the far end can actually perceive an echo of the sound produced at the far end.

To eliminate such echos, a filter with adjustable filter taps is conventionally applied as illustrated at 17 and 19 in FIG. 1. The values of the filter taps are controlled by an adaptive algorithm (e.g., a Least Mean Squares algorithm) illustrated at 17 such that the echo canceller filter at 19 resembles as closely as possible the echo path between the loudspeaker 11 and the microphone 13. The estimated echo produced by the echo canceller filter 19 is subtracted at 15 from the signal output from the microphone 13, such that, ideally, only the near-end signal $x_{near}$ remains as the resulting signal 12.

Conventional techniques of eliminating acoustical echos in communication devices such as illustrated in FIG. 1 have heretofore employed algorithms that operate on the entire frequency range supported by the communication device, for example 300–3400 Hz for a typical conventional telephone.

According to the present invention, improved echo cancellation performance is achieved by dividing the audio signal into subbands, and applying echo cancellation techniques in the subbands. Advantageously, by applying echo cancellation techniques in subbands, the adaptive filter used for echo cancellation can be simplified.

DETAILED DESCRIPTION

Figure 2:
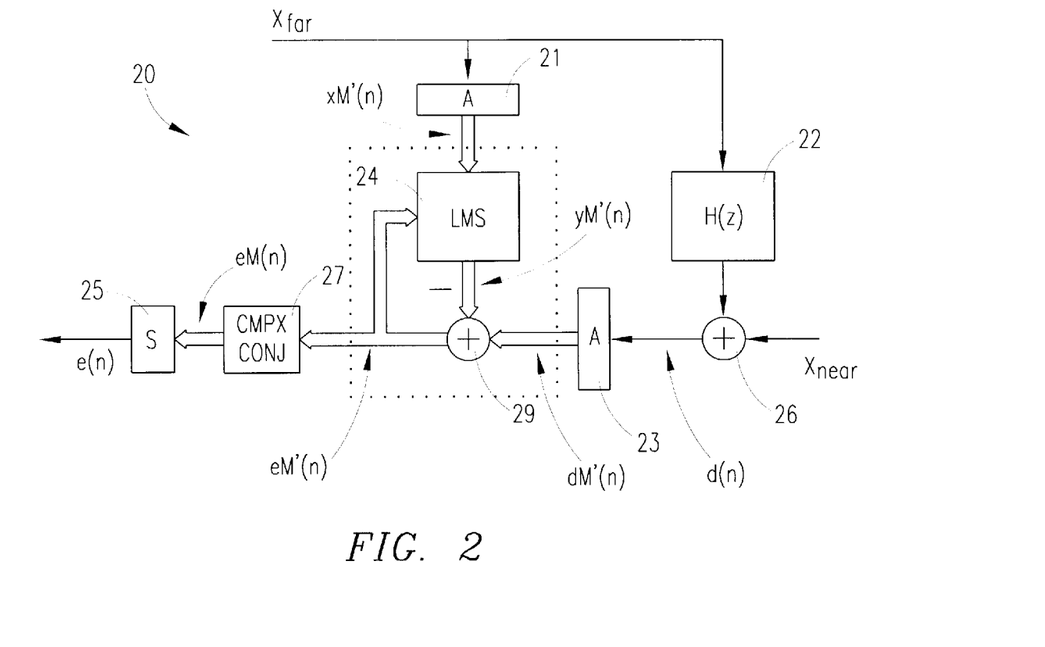
FIG. 2 diagrammatically illustrates pertinent portions of an exemplary communication device including echo cancellation according to the present invention.

FIG. 2 illustrates pertinent portions of an exemplary embodiment of a communication device including an echo canceller 20 according to the present invention. The communication device could be, for example, a telephone (fixed or mobile) including a hands-free arrangement as described above. The far-end acoustic signal $x_{far}$ passes through an acoustic echo path H(z) illustrated generally at 22, and is added at 26 (for example at a microphone) to the near-end acoustical signal $x_{near}$. The resulting signal d is applied to an analysis filter bank A at 23. The filter bank 23 splits the signal d into a plurality of frequency subbands, and downsamples the subband signals. Similarly, the far-end signal $x_{far}$ is applied to an analysis filter bank A at 21 which, in one embodiment, is identical to the analysis filter bank at 23.

An echo cancellation operator including a Least Mean Squares (LMS) operator 24 and a summation operator 29 is coupled to the analysis filter banks 21 and 23 such that the LMS operator 24 receives the output x of the filter bank 21, and the summation operator 29 receives the output d of the filter bank 23. The output of the summation operator 29 is fed back to the LMS operator 24 and is also applied to a complex conjugate operator 27 of the echo canceller, whose output is in turn coupled to a synthesis filter bank S at 25.

Figures 3, 4:
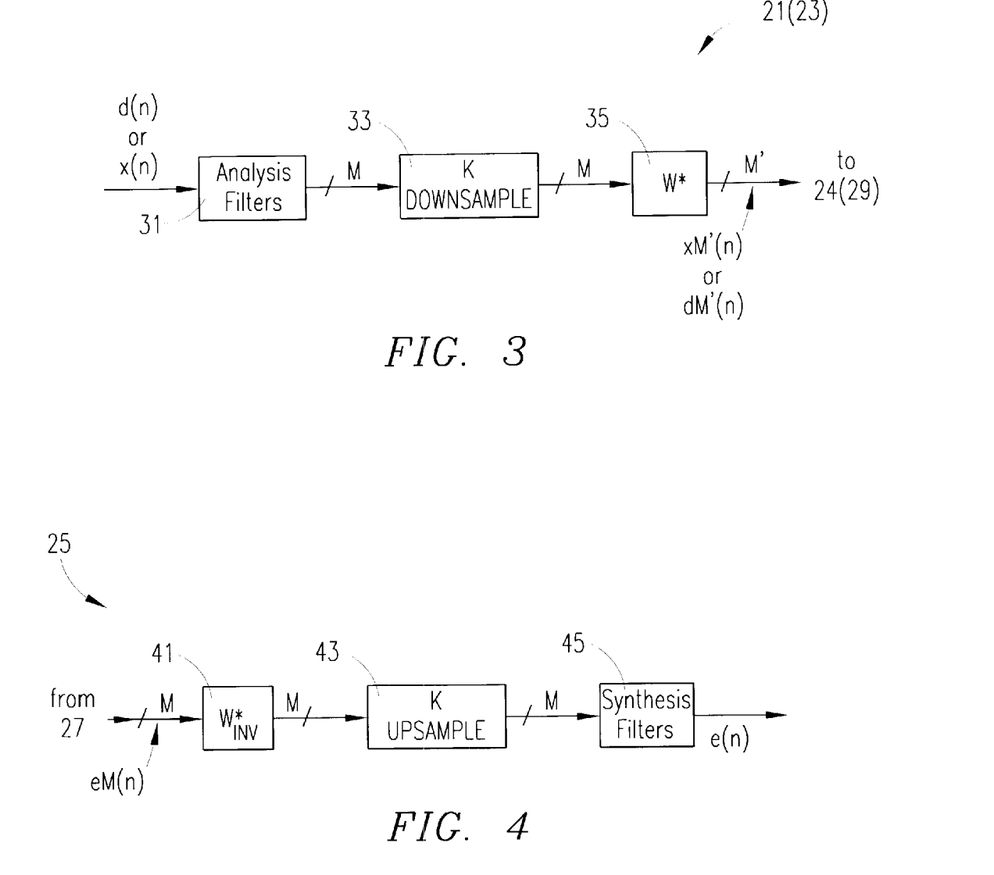
FIG. 3 diagrammatically illustrates an exemplary embodiment of the analysis filter banks of FIG. 2.
FIG. 4 diagrammatically illustrates an exemplary embodiment of the synthesis filter bank of FIG. 2.

FIG. 3 illustrates an exemplary embodiment of the FIG. 2 analysis filter banks 21, operating on x (n), and 23, operating on d(n). The digitized far-end signal x(n) (or digitized near-end signal d(n)) in FIG. 3 is input to a bank of analysis filters 31, for example a bank of conventional polyphase bandpass filters, which split the far-end signal into M frequency subbands. The subband signals are then downsampled by a factor of K by a downsampler 33, and the resulting downsampled subband signals are applied to a Discrete Fourier Transform (DFT) filter W* at 35. The arrangement of FIG. 3 provides for lower computational complexity, because the signal is down-sampled in each of the M subbands by a factor of K. Thus, the number of filter tap computations for each output sample of each subband is reduced by a factor of K. Also, the arrangement of FIG. 3 will provide for faster convergence of the adaptive echo cancellation algorithm, because the signal in each subband is "whiter" and has a smoother energy level than would the input signal x(n) (or d(n)). In one embodiment, the values of M and K are chosen such that M/K=4/3. Analysis filters, DFT filters and downsamplers are well-known in the art, and can be implemented in any suitable conventional manner in the embodiment of FIG. 3.

FIG. 4 illustrates an exemplary embodiment of the synthesis filter bank 25 of FIG. 2. As shown in FIG. 4, and as further discussed below, an error signal eM formatted in M frequency subbands is applied to an inverse DFT filter $W^*_{INV}$ at 41. This filter performs an inverse DFT operation on the subband error signals. The output of the filter 41 is applied to an upsampler 43 which upsamples the subband signals by a factor of K. The upsampled subband signals are then input to respective synthesis filters at 45. The synthesis filters have their outputs coupled together in conventional fashion (not explicitly shown in FIG. 4) to produce the desired, echo-cancelled, output signal e (n) (see also FIG. 2). Inverse DFT filters, upsamplers and synthesis filters are well-known in the art, and can be implemented in any suitable conventional manner in the FIG. 4 embodiment.

Figure 5:
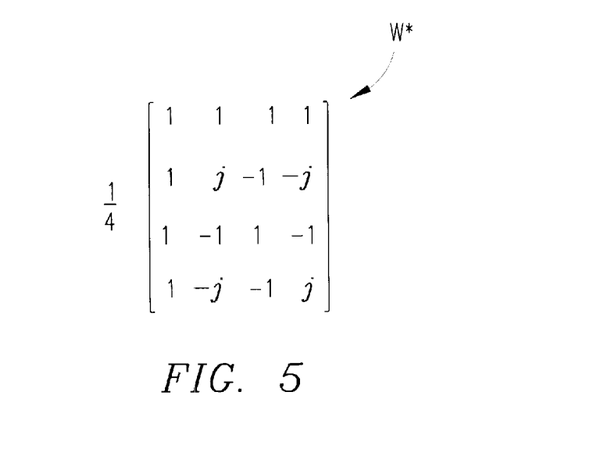
FIG. 5 illustrates an exemplary DFT matrix which can be used in the DFT filters of FIGS. 3 and 4.

FIG. 5 illustrates an exemplary DFT modulation matrix W* which can be used by the filter 35 of FIG. 3, and the transpose of which can be used as W*$_{INV}$ by the filter 41 of FIG. 4. (In this example the transpose is identical to the FIG. 5 matrix). This matrix illustrates a fundamental principle of all DFT matrices, namely that such matrices include rows which are complex conjugates of one another. For example, in the DFT matrix of FIG. 5, rows 2 and 4 are complex conjugates of each other. This in turn means that, when a plurality of subband signals are applied to the DFT matrix, at least two of the resulting output signals will be complex conjugates of each other.

Referring again to FIG. 2, and ignoring for now the M and M' nomenclature, it can be seen generally that, by operation of the summing operator 29, $$e = d - y, \qquad \text{Equation 1}$$

where y is generally the output of the LMS filter 24. The signal e includes a real component $e_r$, and an imaginary component $e_i$, given by $$e_r = d_r - y_r \qquad \text{Equation 2}$$

$$e_i = d_i - y_i \qquad \text{Equation 3}$$

where $d_r$ and $d_i$ are the real and imaginary components of the signal d, and $y_r$ and $y_i$ are the real and imaginary components of the signal y. The real and imaginary components $y_r$ and $y_i$, respectively, are given by $$y_r = x_r h_r^T - x_i h_i^T \qquad \text{Equation 4}$$

$$y_i = x_r h_i^T + x_i h_r^T \qquad \text{Equation 5}$$

where $h_r$ and $h_i$ are the respective real and imaginary adaptive filter coefficient matrices conventionally used by the LMS operator 24, and $x_r$ and $x_i$ are the real and imaginary components of the signal x.

Combining Equations 2 and 4 yields $$e_r = d_r - x_r h_r^T + x_i h_i^T, \qquad \text{Equation 6}$$

and combining Equations 3 and 5 yields $$e_i = d_i - x_r h_i^T - x_i h_r^T. \qquad \text{Equation 7}$$

As mentioned above, the multiple subband output of filter bank 21 will include at least two subbands which are complex conjugates, as will the multiple subband output of analysis filter bank 23. Accordingly, the error signal attributable to a given subband which is a complex conjugate of another subband will have a real component given by $$e_{rcc} = d_{rcc} - y_{rcc}, \qquad \text{Equation 8}$$

where $d_{rcc}$ is the real component of the complex conjugate subband signal output from analysis filter bank 23, and $y_{rcc}$ is the real component of the subband signal output from LMS filter 24 in response to the complex conjugate subband signal output from analysis filter bank 21. Similarly, the imaginary component $e_{icc}$ attributable to the complex conjugate signals output from analysis filter banks 21 and 23 is given by $$e_{icc} = d_{icc} - y_{icc}. \qquad \text{Equation 9}$$

Also, $$y_{rcc} = x_{rcc} h_{rcc}^T - x_{icc} h_{icc}^T, \qquad \text{Equation 10}$$

$$y_{icc} = x_{rcc} h_{icc}^T + x_{icc} h_{rcc}^T, \qquad \text{Equation 11}$$

where $x_{rcc}$ and $x_{icc}$ are the real and imaginary components of the complex conjugate subband signal output from analysis filter bank 21, and $h_{rcc}$ and $h_{icc}$ are the respective real and imaginary adaptive filter coefficient matrices computed by the LMS filter algorithm in response to $x_{rcc}$ and $x_{icc}$.

By the definition of complex conjugates, we have $$x_{rcc} = x_r \qquad \text{Equation 12}$$

$$x_{icc} = -x_i \qquad \text{Equation 13}$$

$$d_{rcc} = d_r \qquad \text{Equation 14}$$

$$d_{icc} = -d_i \qquad \text{Equation 15}$$

Due to the linearity of the LMS algorithm, the filter coefficients h respectively associated with input subband signals that are complex conjugates of each other will themselves be complex conjugates of each other. Accordingly, applying the definition of complex conjugates, $$h_{rcc} = h_r \qquad \text{Equation 16}$$

$$h_{icc} = -h_i \qquad \text{Equation 17}$$

Combining Equations 8, 10, 12–14, 16 and 17, yields $$e_{rcc} = d_r - x_r h_r^T + x_i h_i^T$$

$$= e_r.$$

Similarly, combining Equations 9, 11–13, and 15–17 yields $$e_{icc} = -d_i + x_r h_i^T + x_i h_r^T \qquad \text{Equation 19}$$

$$= -e_i.$$

Accordingly, and referring again to FIG. 2, if a first subband signal x from filter bank 21 and a first subband signal d from filter bank 23 are applied to the echo cancellation operator, the resulting subband signal e will be the complex conjugate of a subband signal $e_{cc}$ (including real part $e_{rcc}$ and imaginary part $e_{icc}$) that would be produced by the echo cancellation operator in response to second subband signals $x_{cc}$ and $d_{cc}$, where $x_{cc}$ and $d_{cc}$ are respectively output from filter banks 21 and 23, and are respective complex conjugates of the first subband signals x and d output from filter banks 21 and 23. Thus, any complex conjugate subband signals need not be forwarded from the filter banks 21 and 23 to the echo cancellation operator, because the associated output signal $e_{cc}$ is easily determined by obtaining the complex conjugate of the signal e associated with the first signals x and d.

This is illustrated in FIGS. 2 and 3 wherein, although the analysis filters 31 produce M subbands, only M' subbands are output from the DFT filter 35, wherein M' is less than M, but at least M/2+1 in some embodiments. For example, if M=4, and the matrix of FIG. 5 is implemented in the DFT filter 35, then M'3, because one of the subband signals produced by the filter 35 will be the complex conjugate of another of the subband signals produced by the filter 35, and therefore need not be applied to the echo cancellation operator at 24 and 29 in FIG. 2.

A further advantage according to the invention of applying echo cancellation in subbands is illustrated by the following example. In a telecommunications application, if the input signal is band-limited to 3400 Hz, the sampling frequency is 8000 Hz, and 8 subbands are used, then one of the frequency subbands will be between 3500 and 4000 Hz. Because this frequency band has no spectral energy in it, this band can be advantageously discarded without any distortion occurring. Noting also that, for this example, $M/2+1 = 8/2+1=5$, it can be seen that three additional subbands can be discarded due to the complex conjugate symmetry of the DFT matrix. Accordingly, using the present invention, the total number of subbands to be input to the echo cancellation operator is reduced in this example from $M=8$ subbands to $M'=4$ subbands. Similarly, with $M=16$ subbands, $M/2+1 = 16/2+1=9$, and 2 subbands will have no spectral energy therein, so echo cancellation filtering is applied to only $M'=7$ subbands.

The reduction in subbands from M to M' is designated generally in FIG. 2 by the signal xM' (n) output from filter bank 21, the signal yM' (n) output from the LMS operator 24, and the signal dM' (n) output from the filter bank 23. Similarly, the signal eM' (n) output from summation operator 29 includes M' subbands. This signal is input to a complex conjugate operator 27 which produces from the subband signals in eM' (n) the complex conjugate subband signals that would otherwise have been produced by the echo cancellation operator, thereby producing the signal eM(n) including M subbands.

Figure 6:
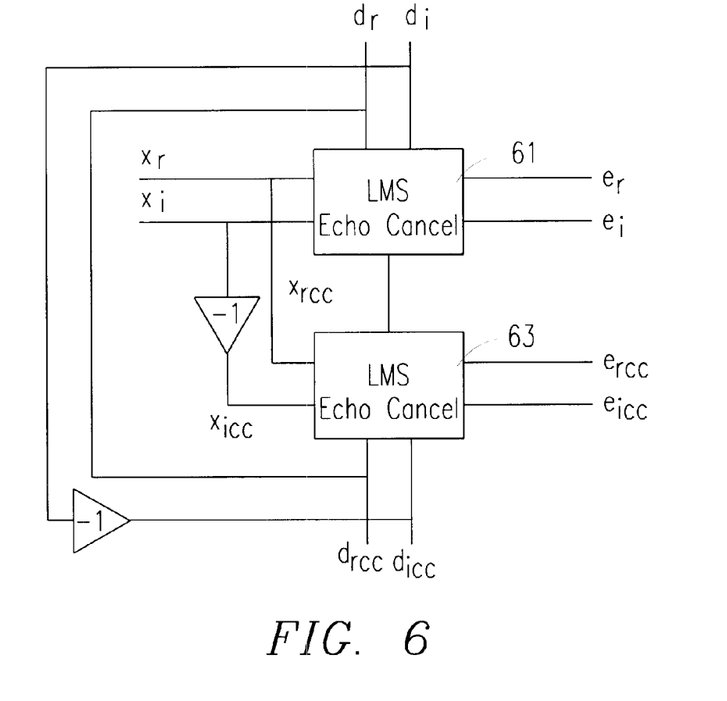
FIG. 6 diagrammatically illustrates an exemplary echo canceller calculation example according to the invention.

FIG. 6 illustrates diagrammatically a calculation example in view of Equations 8–19 above. More specifically, if the signal inputs to a first LMS echo cancellation operator 63 are complex conjugates of the signals input to a second LMS echo cancellation operator 61, then the output of the LMS echo cancellation operator 63 will be the complex conjugate of the output of the LMS echo cancellation operator 61.

Figure 7:
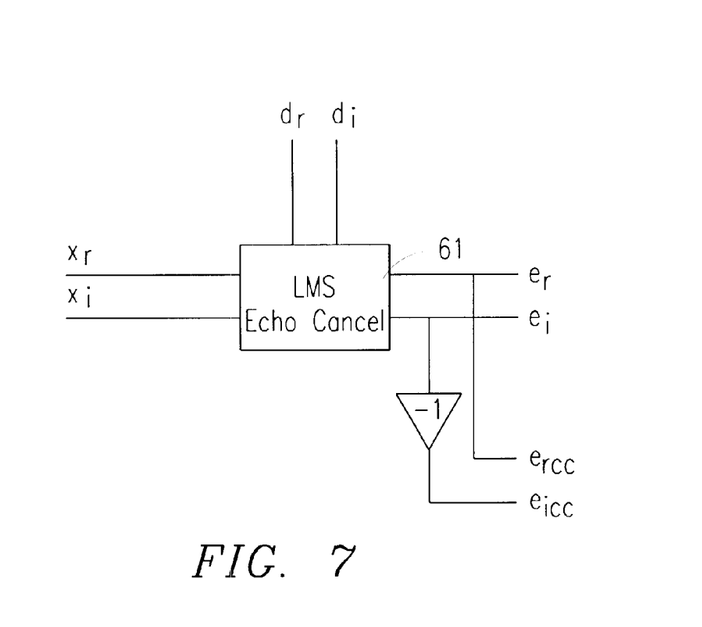
FIG. 7 diagrammatically illustrates an exemplary echo canceller calculation simplification according to the invention.

FIG. 7 diagrammatically illustrates a calculation simplification example in view of FIG. 6 and Equations 8–19 above. More particularly, the signals $e_{rcc}$ and $e_{icc}$ associated with the signals $x_{rcc}$, $x_{icc}$, $d_{rcc}$ and $d_{icc}$ of FIG. 6 can be produced directly from the signals $x_r$, $x_i$, $d_r$ and $d_i$, by performing a complex conjugate operation on the signals $e_r$ and $e_i$.

Figure 8:
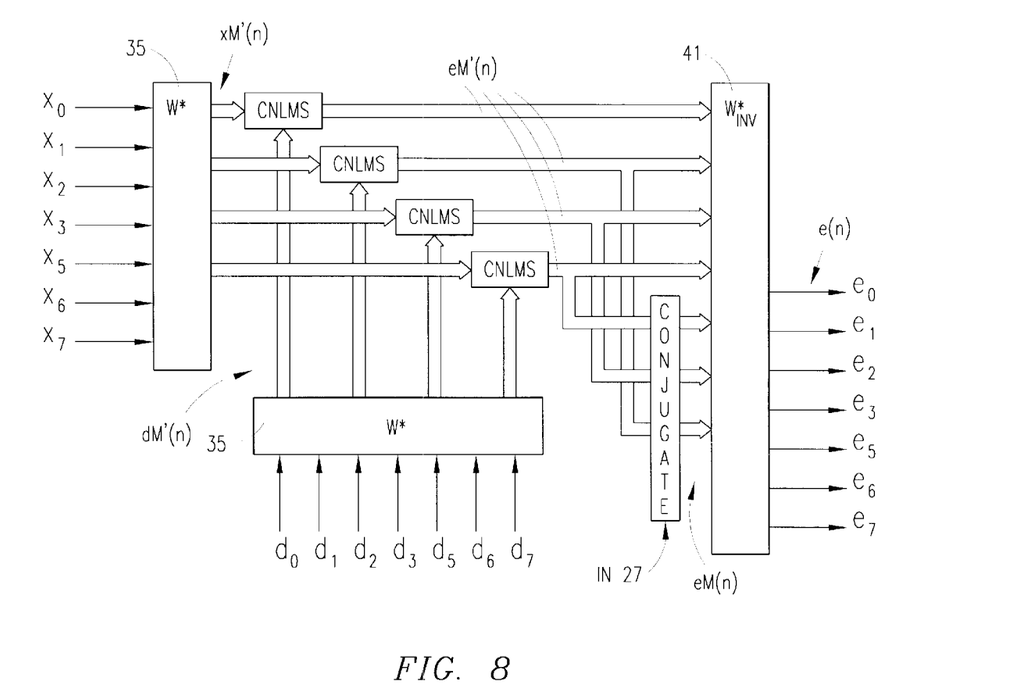
FIG. 8 diagrammatically illustrates pertinent portions of an exemplary embodiment of the echo canceller of FIG. 2.

FIG. 8 diagrammatically illustrates pertinent portions of an exemplary embodiment of the echo canceller of FIG. 2. The embodiment of FIG. 8 is illustrative of the aforementioned example of a telecommunications application wherein the input signal is band-limited to 3400 Hz, the sampling frequency is 8000 Hz, and $M=8$ subbands. As mentioned above, one of the subbands has no spectral energy therein, and may therefore be discarded (note subband signals $x_4$ and $d_4$ have already been discarded in FIG. 8), so that M is effectively equal to 7. Furthermore, as described above, 3 more subbands can be discarded due to the symmetry of the DFT matrices in the filters 35, such that the signals xM' (n) and dM' (n) include only 4 subbands ($M'=4$). In the example of FIG. 8, the echo cancellation operator utilizes conventional Complex Normalized Least Mean Squares (CNLMS) techniques to produce the 4-subband output signal eM' (n), 3 of whose subbands are used to produce complex conjugates in the complex conjugate section 27, thereby producing a 7-subband signal to be input to the filter 41.

Figure 9:
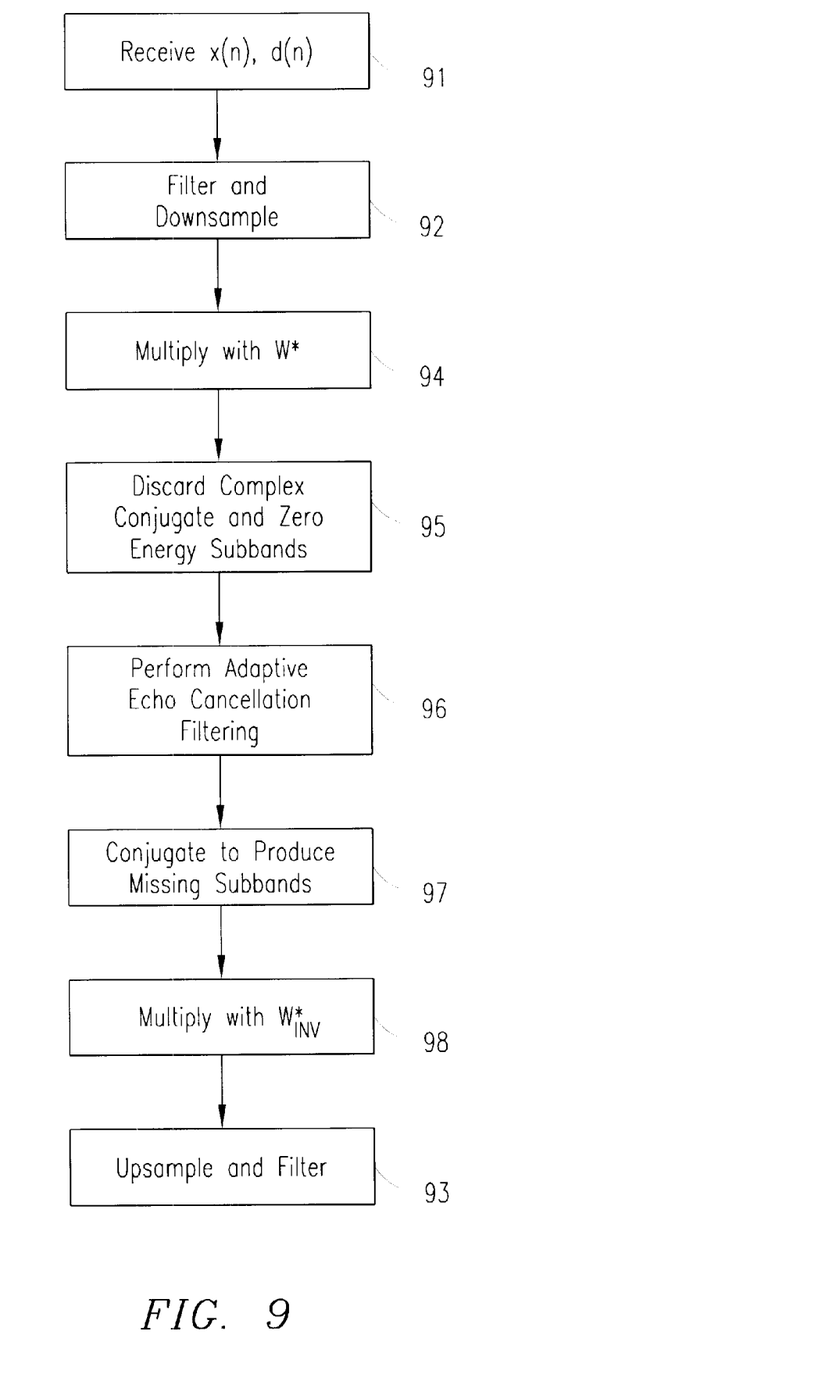
FIG. 9 illustrates exemplary operations which can be performed by the echo canceller embodiments of FIGS. 2 and 8.

FIG. 9 illustrates exemplary operations which can be performed by communication devices including echo cancellation according to the invention. At 91, the input signals x(n) and d(n) are received. At 92, the signals x(n) and d(n) are filtered in M bandpass filters to produce respective signals including M frequency subbands, and the M subband signals are downsampled K times. At 94, the downsampled signals are multiplied by the DFT matrix W*. At 95, the unnecessary subband signals, including complex conjugate subband signals and subband signals having no spectral energy, are discarded. At 96, adaptive echo cancellation filtering is performed on the remaining subband signals. At 97, the missing components of the signal e are produced by obtaining complex conjugates of the existing subband signals of signal e. At 98, the resulting signal e including M subbands is multiplied by the inverse DFT matrix. At 93, the M-subband signal is upsampled by a factor of K, and then applied to M polyphase filters to obtain the desired, echo-cancelled signal e(n).

As is clearly evident from the foregoing description, the present invention reduces the number of calculations needed to provide echo cancellation in a communication device. For example, if the LMS operator includes a finite impulse response (FIR) filter with 256 taps, an 8 band system with complex signals would require 2×256×8 filter calculations. This number can be divided by a factor close to 2 by applying the principles of the present invention. Alternatively, the performance of the system can be enhanced. For example, if L taps are used in each LMS operator in a system with M subbands, then the (M/2−1)×L taps that are saved according to the principles of the invention can be distributed as desired to the other bands, thus enhancing the performance of the remaining bands.

It will evident to workers in the art that the embodiments of the present invention described above with respect to FIGS. 2–9 can be implemented, for example, by a suitably programmed data processing device such as a digital signal processor (DSP) provided in a communication device according to the invention. Alternatively, the above-described embodiments can be provided in a suitably programmed data processing device in combination with external components coupled thereto.

Although exemplary embodiments of the present invention have been described above in detail, this does not limit the scope of the invention, which can be practiced in a variety of embodiments.

What is claimed is:

1. An acoustic echo canceller, comprising:

a first input for receiving a far-end digitized acoustical signal;

a second input for receiving a near-end digitized acoustical signal;

a first analysis filter bank coupled to said first input for partitioning said far-end signal into M frequency subband far-end signals and producing from said M frequency subband far-end signals M' further frequency subband far-end signals where M' is less than M;

a second analysis filter bank coupled to said second input for partitioning said near-end signal into M frequency subband near-end signals and for producing from said M frequency subband near-end signals M' further frequency subband near-end signals;

an acoustic echo cancellation operator coupled to said first and second analysis filter banks for receiving from said first analysis filter bank said M' further frequency subband far-end signals, and for receiving from said second analysis filter bank said M' further frequency subband near-end signals, said acoustic echo cancellation operator operable in response to said M' further frequency subband far-end signals and said M' further frequency subband near-end signals to produce M' frequency subband error signals;

a complex conjugate operator coupled to said acoustic echo cancellation operator for receiving therefrom M–M' of said frequency subband error signals and producing complex conjugates of said M–M' frequency subband error signals; and a synthesis filter bank coupled to said complex conjugate operator for receiving said M–M' complex conjugates and also coupled to said acoustic echo cancellation operator for receiving therefrom said M' frequency subband error signals, said synthesis filter bank responsive to said M' frequency subband error signals and said M–M' complex conjugates for producing an echo-cancelled near-end signal.

2. The acoustic echo canceller of claim 1, wherein said acoustic echo cancellation operator includes a Least Mean Squares operator.

3. The acoustic echo canceller of claim 2, wherein said acoustic echo cancellation operator includes a Complex Normalized Least Mean Squares operator.

4. The acoustic echo canceller of claim 1, wherein said analysis filter banks each include a filter implementing an M×M modulation matrix having at least one pair of complex conjugated rows, said filter producing the associated M' further frequency subband signals.

5. The acoustic echo canceller of claim 4, wherein said modulation matrix is a DFT matrix having at least one pair of complex conjugated rows.

6. A method of performing acoustic echo cancellation, comprising:

receiving a far-end digitized acoustical signal;

receiving a near-end digitized acoustical signal;

partitioning said far-end signal into M frequency subband far-end signals;

partitioning said near-end signal into M frequency subband near-end signals;

producing from said M frequency subband far-end signals M' further frequency subband far-end signals where M' is less than M;

producing from said M frequency subband near-end signals M' further frequency subband near-end signals;

producing M' frequency subband error signals in response to the M' further frequency subband far-end signals and the M' further frequency subband near-end signals;

producing complex conjugates of M–M' of the frequency subband error signals; and producing an echo-cancelled near-end signal in response to said M' frequency subband error signals and the M–M' complex conjugates.

7. The method of claim 6, wherein said first-mentioned and second-mentioned producing steps each include applying to the associated M frequency subband signals an M×M modulation matrix having at least one pair of complex conjugated rows.

8. The method of claim 7, wherein said modulation matrix is a DFT matrix having at least one pair of complex conjugated rows.

9. The method of claim 6, wherein said third-mentioned producing step includes using a Least Mean Squares technique to produce the M' frequency subband error signals.

10. An acoustic echo canceller comprising:

a first input for receiving a far-end digitized acoustical signal; and a second input for receiving a near-end digitized acoustical signal;

a first analysis filter bank coupled to said first input for partitioning said far-end signal into M frequency subband far-end signals and producing from said M frequency subband far-end signals M' further frequency subband far-end signals, wherein M' is less than M;

a second analysis filter bank coupled to said second input for partitioning said near-end signal into M frequency subband near-end signals and for producing from said M frequency subband near-end signals M' further frequency subband near-end signals;

an acoustic echo cancellation operator coupled to said first and second analysis filter banks for receiving from said first analysis filter bank said M' further frequency subband far-end signals, and for receiving from said second analysis filter bank said M' further frequency subband near-end signals, said acoustic echo cancellation operator operable in response to said M' further frequency subband far-end signals and said M' further frequency subband near-end signals to produce M' frequency subband error signals;

a complex conjugate operator coupled to said acoustic echo cancellation operator for receiving therefrom N of said frequency subband error signals and producing complex conjugates of said N frequency subband error signals, wherein $N \leq M-M'$; and a synthesis filter bank coupled to said complex conjugate operator for receiving said N complex conjugates and also coupled to said acoustic echo cancellation operator for receiving therefrom said M' frequency subband error signals, said synthesis filter bank responsive to said M' frequency subband error signals and said N complex conjugates to produce an echo-cancelled near-end signal.

11. The acoustic echo canceller of claim 10, wherein said acoustic echo cancellation operator includes a Least Mean Squares operator.

12. The acoustic echo canceller of claim 11, wherein said acoustic echo cancellation operator includes a Complex Normalized Least Mean Squares operator.

13. The acoustic echo canceller of claim 10, wherein said analysis filter banks each include a filter implementing a modulation matrix having at least one pair of complex conjugated rows, said filter producing the associated M' further frequency subband signals.

14. The acoustic echo canceller of claim 13, wherein said modulation matrix is a DFT matrix having at least one pair of complex conjugated rows.

15. The acoustic echo canceller of claim 10, wherein the first analysis filter bank includes a first set of M downsamplers for reducing a sampling rate of said M frequency subband far-end signals prior to producing said M' further frequency subband far-end signals and the second analysis filter bank includes a second set of M downsamplers for reducing a sampling rate of said M frequency subband near-end signals prior to producing said M' further frequency subband near-end signals.

16. The acoustic echo canceller of claim 15, wherein the first analysis filter bank further includes a first Discrete Fourier Transform filter for producing said M' further frequency subband far-end signals from the M downsampled frequency subband far-end signals and the second analysis filter bank further includes a Second Discrete Fourier Transform filter for producing said M' further frequency subband near-end signals from the M downsampled frequency subband near-end signals.

17. The acoustic echo canceller of claim 16, wherein the synthesis filter bank further includes:

an inverse Discrete Fourier Transform filter for performing an inverse Discrete Fourier Transform on said M' frequency subband error signals and said N complex conjugates; and a set of M'+N upsamplers for increasing a sampling rate of said M' frequency subband error signals and said N complex conjugates prior to producing said echo-cancelled near-end signal.

18. The acoustic echo canceller of claim 15, wherein the first analysis filter bank produces said M' further frequency subband far-end signals by discarding N of the M frequency subband far-end signals, wherein each of the N discarded frequency subband far-end signals comprises a complex conjugate of a respective one of the M' further frequency subband far-end signals, and the second analysis filter bank produces said M' further frequency near-end signals by discarding N of the M frequency subband near-end signals, wherein each of the N discarded frequency subband near-end signals comprises a complex conjugate of a respective one of the M' further frequency subband near-end signals.

19. The acoustic echo canceller of claim 18, wherein the first analysis filter bank produces said M' further frequency subband far-end signals by further discarding at least one of the M frequency subband far-end signals that does not include spectral energy, and the second analysis filter bank produces said M' further frequency near-end signals by further discarding at least one of the M frequency subband near-end signals corresponding to the at least one frequency subband far-end signals that does not include spectral energy.

20. The acoustic echo canceller of claim 19, wherein the N discarded frequency subband far-end signals and the at least one of the M frequency subband far-end signals that does not include spectral energy collectively comprise M−M' of said M frequency subband far-end signals.

21. The acoustic echo canceller of claim 15, wherein the synthesis filter bank further includes a set of M'+N upsamplers for increasing a sampling rate of said M' frequency subband error signals and said N complex conjugates prior to producing said echo-cancelled near-end signal.

22. A method of performing acoustic echo cancellation, the method comprising:

receiving a far-end digitized acoustical signal;

receiving a near-end digitized acoustical signal;

partitioning said far-end signal into M frequency subband far-end signals;

partitioning said near-end signal into M frequency subband near-end signal;

producing from said M frequency subband far-end signals M' further frequency subband far-end signals, wherein M' is less than M;

producing from said M frequency subband near-end signals M' further frequency subband near-end signals;

producing M' frequency subband error signals in response to the M' further frequency subband far-end signals and the M' further frequency subband near-end signals;

producing complex conjugates of N of the frequency subband error signals, wherein N≦M−M'; and producing an echo-cancelled near-end signal in response to said M' frequency subband error signals and the N complex conjugates.

23. The method of claim 22, wherein said first-mentioned and second-mentioned producing steps each include applying to the associated M frequency subband signals a modulation matrix having at least one pair of complex conjugated rows.

24. The method of claim 23, wherein said modulation matrix is a DFT matrix having at least one pair of complex conjugated rows.

25. The method of claim 22, wherein said third-mentioned producing step includes using a Least Mean Squares technique to produce the M' frequency subband error signals.

26. The method of claim 22, wherein the first-mentioned producing step includes the steps of:

reducing the sampling rate of said M frequency subband far-end signals to produce M downsampled frequency subband far-end signals;

multiplying each of the M downsampled frequency subband far-end signals by a modulation matrix having at least one pair of complex conjugated rows to produce M filtered frequency subband far-end signals; and discarding N of the M filtered frequency subband far-end signals, wherein each of the N discarded frequency subband far-end signals comprises a complex conjugate of a respective one of the M' further frequency subband far-end signals; and wherein the second-mentioned producing step includes the steps of:

reducing the sampling rate of said M frequency subband near-end signals to produce M downsampled frequency subband near-end signals;

multiplying each of the M downsampled frequency subband near-end signals by said modulation matrix to produce M filtered frequency subband near-end signals; and discarding N of the M filtered frequency subband near-end signals, wherein each of the N discarded frequency subband near-end signals comprises a complex conjugate of a respective one of the M' further frequency subband near-end signals.

27. The method of claim 26, wherein the first-mentioned producing step includes the step of discarding at least one of the M filtered frequency subband far-end signals that does not include spectral energy, and wherein the second-mentioned producing step includes the step of discarding at least one of the M filtered frequency subband near-end signals corresponding to the at least one frequency subband far-end signal that does not include spectral energy.

28. The method of claim 27, wherein the N discarded frequency subband far-end signals and the at least one of the M frequency subband far-end signals that does not include spectral energy collectively comprise M−M' of said M frequency subband far-end signals.

29. The method of claim 26, wherein the step of producing an echo-cancelled near-end signal includes the steps of:

multiplying each of the M' frequency subband error signals and the N complex conjugates by an inverse of said modulation matrix to produce M'+N inverse-filtered frequency subband error signals;

increasing the sampling rate of said M'+N inverse-filtered frequency subband error signals to produce M'+N upsampled frequency subband error signals; and combining the M'+N upsampled frequency subband error signals to produce the echo-cancelled near-end signal.

* * * * *

UNITED STATES PATENT AND TRADEMARK OFFICE
CERTIFICATE OF CORRECTION

PATENT NO. : 6,757,385 B1
DATED : June 29, 2004
INVENTOR(S) : Fredrik Ehrenstråle et al.

It is certified that error appears in the above-identified patent and that said Letters Patent is hereby corrected as shown below:

<u>Column 4,</u>
Line 30, insert -- Equation 18 --
Line 63, replace "M'3," with -- M'=3, --

Signed and Sealed this

Thirty-first Day of August, 2004

JON W. DUDAS
*Director of the United States Patent and Trademark Office*